United States Patent [19]

Seidl et al.

[11] Patent Number: 5,979,207

[45] Date of Patent: Nov. 9, 1999

[54] ROLLING MILL DRIVE WITH GEAR-TYPE JOINT SPINDLES AND WITH A DEVICE FOR CIRCULATORY LUBRICATION

[75] Inventors: Karl-Heinz Seidl, Hilchenbach; Helmut Kühn, Kreuztal, both of Germany

[73] Assignee: SMS Schloemann-Siemag Aktiengesellschaft, Düsseldorf, Germany

[21] Appl. No.: 09/039,534

[22] Filed: Mar. 16, 1998

[30] Foreign Application Priority Data

Mar. 20, 1997 [DE] Germany ............... 197 11 609

[51] Int. Cl.$^6$ ..................................................... B21B 31/07
[52] U.S. Cl. ........................... 72/249; 464/16; 184/6.17
[58] Field of Search ................... 72/238, 249; 464/16, 464/156, 158, 159; 184/6.12, 6.77, 6.19; 475/159, 160; 74/467, 468

[56] References Cited

U.S. PATENT DOCUMENTS

| | | |
|---|---|---|
| 4,990,121 | 2/1991 | Vosbeck et al. |
| 5,000,024 | 3/1991 | Seidl et al. ............... 72/249 |
| 5,029,461 | 7/1991 | Lawrence et al. ............ 72/238 |
| 5,393,267 | 2/1995 | Munyon ................ 464/156 |
| 5,647,597 | 7/1997 | Grochowski .............. 464/16 |

FOREIGN PATENT DOCUMENTS

| | | |
|---|---|---|
| 0324168 | 3/1993 | European Pat. Off. . |
| 1902894 | 7/1973 | Germany . |
| 3706577 | 11/1995 | Germany . |
| 1447733 | 8/1916 | United Kingdom ............... 72/249 |

Primary Examiner—Joseph J. Hail, III
Assistant Examiner—Ed Tolan
Attorney, Agent, or Firm—Friedrich Kueffner

[57] ABSTRACT

A rolling mill drive with gear-type joint spindles arranged between driveable rolls and the gear units of the driveable rolls and equipped with a device for circulatory or pressure lubrication of the gear units. Each spindle has a grooved oil supply ring connectable to an oil supply, wherein oil can be supplied through a central duct of the spindle shaft to the gear-type joints, and with a stationary housing surrounding the spindle shaft at a distance and serving for the oil discharge, and with an oil delivery pump connectable on the pressure side to the oil supply rings and interacting with an oil cooler. Each gear-type joint spindle is surrounded by a pipe at a radial distance so as to form an annular oil return duct. The pipe is open at the end facing the gear unit and protrudes into the oil collection housing provided at this location for effecting oil discharge. The oil return duct is in circulatory oil connection with the central duct through the internally toothed spindle sleeve on the side of the roll stand. On the side of the roll stand, the pipe is guided in an articulated manner and sealed toward the outside and relative to the spindle sleeve through a spherical joint arranged on the pipe.

4 Claims, 4 Drawing Sheets

ROLLING MILL DRIVE WITH GEAR-TYPE JOINT SPINDLES AND WITH A DEVICE FOR CIRCULATORY LUBRICATION

BACKGROUND OF THE INVENTION

1. Field of the Invention

The present invention relates to a rolling mill drive with gear-type joint spindles arranged between driveable rolls and the gear units of the driveable rolls and equipped with a device for circulatory or pressure lubrication of the gear units. Each articulated spindle has a grooved oil supply ring connectable to an oil supply, wherein oil can be supplied through a central duct of the spindle shaft to the gear-type joints, and with a stationary housing surrounding the spindle shaft at a distance and serving for the oil discharge, and with an oil delivery pump connectable on the pressure side to the oil supply rings and interacting with an oil cooler.

2. Description of the Related Art

When rolling, for example, comparatively thin and wide strips, it is necessary to displace the work rolls axially in the roll stand by a certain adjustment range for correcting any planarity errors of the rolled material and, if necessary, to adjust the width of the roll gap in accordance with different rolling schedules. For this purpose, an adjustment drive effects the axial displacement of the work rolls by exactly predetermined distances within the roll stand, while the rotary drive of the work rolls takes place in the known manner through gear-type joint spindles which are in connection with drive motors between the driveable work rolls and driving gear units. The gear-type joint spindles must be constructed in such a way that they compensate the axial and vertically adjustable displacements of the work rolls within the roll stand, on the one hand, and that they transmit the full drive power, for example, from pinions, to the work rolls. The interacting wobblers in the spline gearings are subjected to high frictional forces and develop heat as a result, and must be continuously supplied with lubricant for reducing the sliding friction and the temperature increase. For the purpose of a problem-free lubrication and cooling of the gear-type joints, the prior art provides for a circulatory oil lubrication which ensures a problem-free supply of all lubrication points of the gear-type joints with lubricant and, moreover, ensures the required discharge of the friction heat from the gear-type joints.

EP 0 324 168 B1 discloses a rolling mill drive with axially displaceable gear-type joint spindles arranged between drive shafts and driven rolls between drive necks of pinions and drive necks of the rolls. Arranged at each spindle head is a wobbler provided with a spiral toothing and a coupling sleeve provided with an internal toothing and surrounding the wobbler, wherein the coupling sleeve, in turn, is connected to a drive gear-type neck or to a roll neck. Provided for this drive arrangement is a circulatory oil lubrication in which an oil supply ring is arranged in a stationary oil housing, wherein the oil supply ring surrounds the spindle shaft and is provided on the side facing the spindle shaft with an internal annular groove which is in open connection with an oil duct leading to the spindle axis. This oil duct leads into a concentrically arranged central duct from which the gear-type joints are supplied in a suitable manner with lubrication oil. Oil reservoirs are provided on the spindle heads on both sides, wherein the oil reservoirs are each connected to an oil housing rotatably mounted on the coupling sleeve, wherein, for this purpose, the rotatable coupling sleeve is provided with a labyrinth-type seal whose other sealing elements are connected to the housing.

During a roll change, at least the spindle heads on the side of the roll stand have to be removed from the coupling sleeve on the side of the rolls; this requires a very labor-intensive assembly because of the oil housing with labyrinth-type seals located on this side. Moreover, an oil contamination is unavoidable during operation, wherein, for example, in the case of labyrinth-type seals, experience has shown that water/emulsion cooling liquid can penetrate into the oil reservoirs.

DE 1 902 894 discloses an gear-type joint spindle for rolling mill drives with a device for circulatory lubrication which includes a grooved ring for effecting the oil supply, wherein the grooved ring sealingly surrounds the spindle shaft and is mounted so as to be non-rotatable relative to the spindle shaft, and wherein oil can be supplied from the ring through ducts of the spindle shaft to the gear-type joints. The device further includes a non-rotatable housing for effecting the oil discharge, wherein the housing surrounds the spindle shaft at a distance. The device further includes an oil delivery pump which on an intake side is in connection with a cooling device, preferably with the intermediate arrangement of a cooling device, and is on the pressure side in connection with the grooved ring. The housing has in the area where the spindle shaft extends through the housing lamella walls which are engaged with play in a labyrinth-type manner by lamella rings provided on the spindle shaft.

This arrangement also requires a relatively complicated assembly when rolls are exchanged resulting in disadvantageously long idle times. On the other hand, in this arrangement, it is also not possible to exclude with absolute certainty a contamination of the circulating oil, which makes it necessary to exchange the oil after relatively short periods of operation, or the circulating oil must be purified in the known manner with the use of an oil centrifuge, which is also very expensive.

DE 37 06 577 C2 discloses a rolling mill drive with gear-type joint spindles and wobblers provided with spiral toothings mounted on the ends of the spindle shafts as well as connection sleeves provided with internal toothings engaging around the wobblers, wherein the connection sleeves are supported at both ends of the spindle shaft by means of support balls and pressure pistons; the drive further includes a circulatory oil lubrication. The central duct of this oil lubrication is equipped with bores and oil lines for lubricating all friction surfaces between the wobbler and the axially displaceable guide sleeve and the support balls which are displaceable against the pressure pistons and the spiral toothings which are displaceable against the internal toothings.

In this known rolling mill drive, the spindle heads are also located within the oil collection housings from where the oil return is pulled off and is returned by means of a pressure pump once again into the circulation.

This drive has in principle the same disadvantages as the rolling mill drives discussed above, i.e., a progressive contamination of the oil during the operation and difficult assembly conditions for the roll exchange in the area of the spindle heads on the side of the roll stand.

SUMMARY OF THE INVENTION

Therefore, it is the primary object of the present invention to provide an improved rolling mill drive of the above-described type and to minimize the structural and assembly-technical requirements particularly for the purpose of significantly reducing the reassembly period during roll changes, and to avoid progressive contamination of the circulating oil resulting from operation while removing as much heat as possible and equalizing the temperature by means of the circulatory oil flow.

In accordance with the present invention, each gear-type joint spindle is surrounded by a pipe at a radial distance so as to form an annular oil return duct. The Pipe is open at the end facing the gear unit and protrudes into the oil collection housing provided at this location for effecting oil discharge. The oil return duct is in circulatory oil connection with the central duct through the internally toothed spindle sleeve on the side of the roll stand. On the side of the roll stand, the pipe is guided in an articulated manner and sealed toward the outside and relative to the spindle sleeve through a spherical joint arranged on the pipe.

Since each gear-type joint is surrounded by a pipe at a radial distance so as to form an annular oil return duct and this pipe is open at the end facing the gear unit and protrudes for effecting the oil discharge into the oil collection housing provided at this location, wherein the oil return duct is in communication with the central duct through the internally toothed spindle sleeve on the side of the roll stand and the pipe is sealed from the outside on the side of the roll stand relative to the spindle sleeve by a spherical joint arranged on the pipe, the oil circulation is deflected within the drive system in a countercurrent direction for flowing in the area of the spindle head on the side of the roll stand and is returned through the oil return duct to the spindle head on the side of the gear unit, wherein the oil is preferably conducted through an oil cooler into the oil delivery pump and is then again returned into the circulation.

The configuration according to the present invention produces the significant advantage that no oil is discharged at the spindle head on the side of the roll stand and, therefore, it is not necessary to provide labyrinth-type seals and an oil collection housing. This significantly simplifies the operations required for assembly and disassembly, for example, in connection with a roll change and, thus, the reassembly times required for this purpose are drastically reduced which means that the productivity is increased and the costs are reduced. Simultaneously, these measures have a positive effect on the lack of contamination of the circulating oil flow because, instead of a stationary oil collection housing, labyrinth-type seals are only required on one side of the rolling mill drive and, therefore, these seals may be of the efficient and expensive type and may be arranged in a protected manner. A relatively large quantity of oil may be used for the circulation, so that not only the lubrication effect is intensified, but also the heat removal is increased and, thus, the conditions are provided for a long and low-wear availability of the roll drive.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
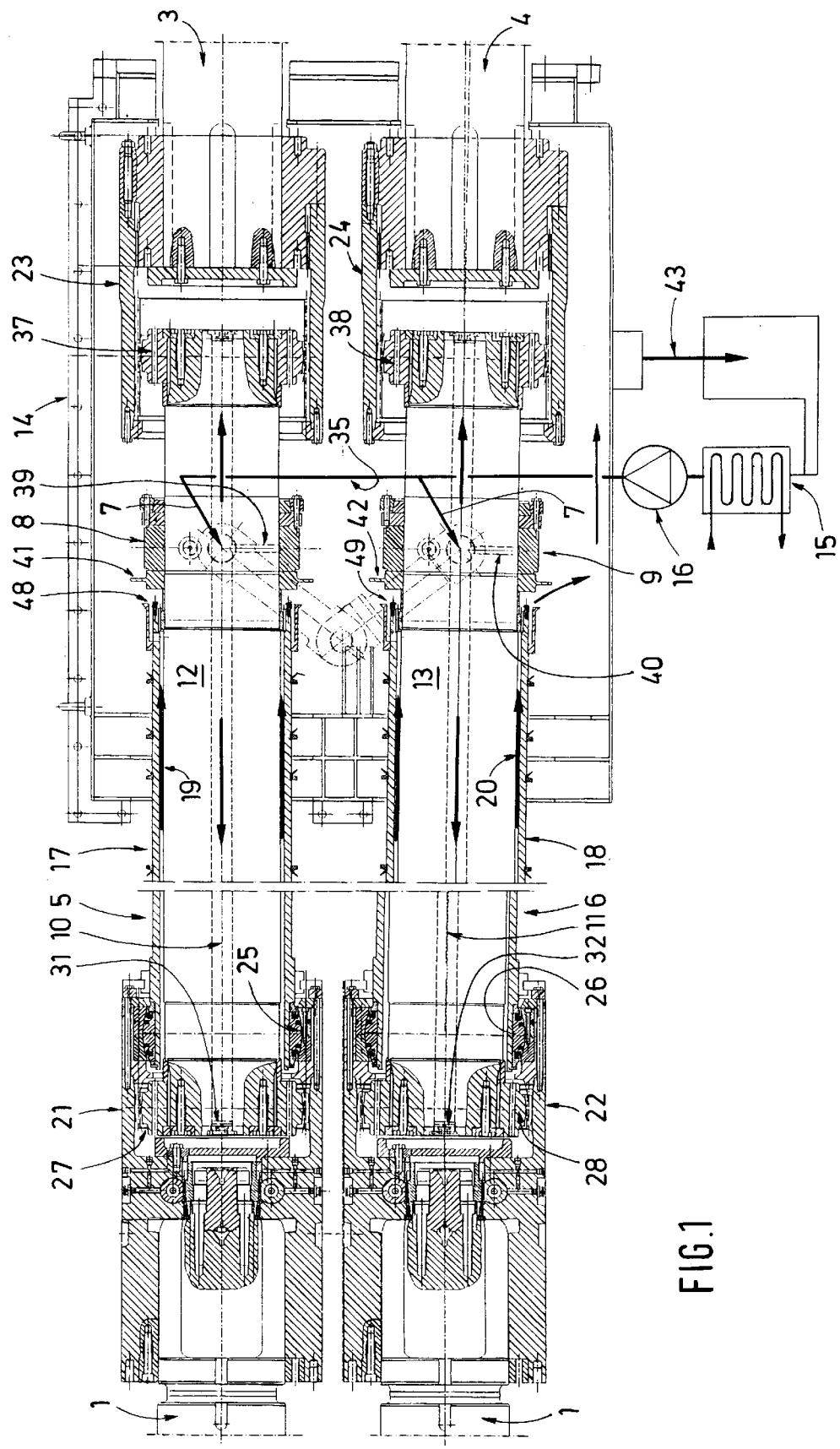
FIG. 1 is a sectional view of a rolling mill drive with two gear-type joint spindles.

The rolling mill drive shown in FIG. 1 includes gear-type joint spindles 5,6 which are arranged between driveable rolls 1,2 and the gear units 3,4 for the rolls 1,2 and are provided with a device for the circulatory lubrication of the gear unit, wherein the spindles 5, 6 each have a grooved oil supply ring 8, 9 which is connectable to an oil supply 7. From the oil supply ring 8, 9, oil is conducted through a central duct 10, 11 of the spindle 12, 13 to the gear-type joints 27, 28. Also provided is a stationary housing serving for the oil discharge and surrounding the spindle shaft 12, 13 at a distance, as well as an oil delivery pump 16 which interacts with an oil cooler 15 and is connectable on a pressure side to the oil supply rings 8, 9.

In accordance with a feature of the present invention, each spindle 5, 6 is surrounded by a pipe 17, 18 at a radial distance so as to form an annular oil return duct 19, 20. The pipe 17, 18 is open at the end facing the gear unit and protrudes for effecting an oil discharge into the oil collection housing 14 provided at this location. The oil return duct 19, 20 is in communication with the central duct 10, 11 for effecting the oil circulation through the internally toothed spindle sleeve 21, 22 arranged on the side of the roll stand. The pipe 17, 18 is guided in an articulated manner and sealed toward the outside relative to the spindle sleeve 21, 22 through a spherical joint 25, 26 arranged on the pipe.

The central duct 10, 11 extends through the gear-type joint 37, 38 on the side of the gear unit and, projecting into the internally toothed spindle sleeve 23, 24, ends with a throttle 29, 30. At the end facing the roll stand, the central duct 10, 11 also extends through the gear-type joint 27, 28 provided at this location and ends in the joint with a throttle 31, 32. These throttles 29–32 have the purpose of making the oil circulation more uniform and of proportionally supplying the pressure oil to the respective spindle joints.

Figure 2:
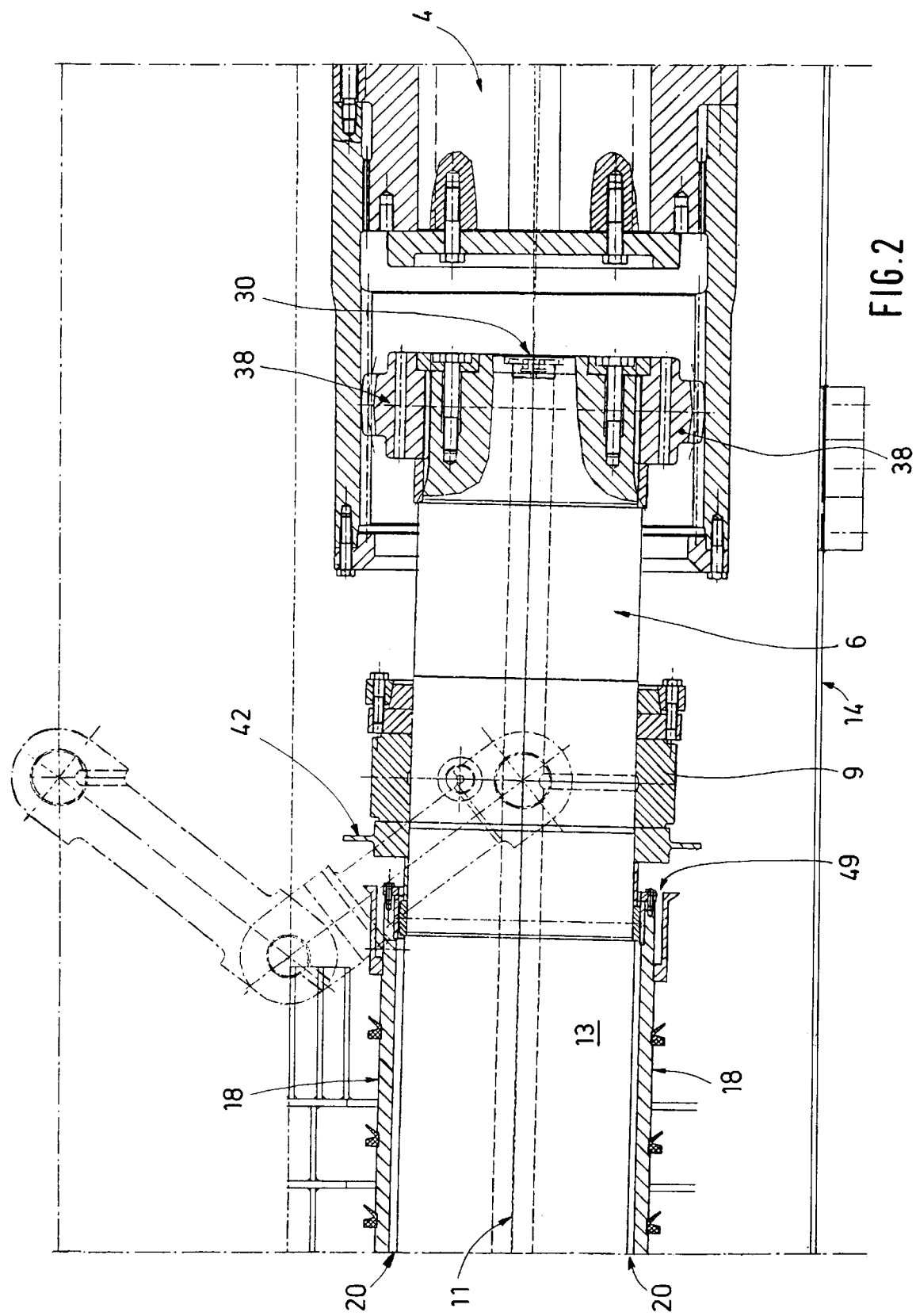
FIG. 2 is a sectional view, on a larger scale, of a portion of a gear-type joint spindle drive on the drive side.

As is apparent from FIGS. 1 and 2, in the twin-type arrangement of the gear-type joint spindles 5, 6, the oil supply rings 8, 9 are connected to a common pressure line 35 for effecting the oil supply, wherein the pressure line 35 is connected to the oil pump 16. The pressure line 35 preferably is a flexible oil pressure hose.

As is further apparent from FIGS. 1 and 2, the oil supply rings 8, 9 are arranged in the area of the spindle shafts 12, 13 between the open ends 48, 49 of the oil return pipes 18, 19 and the gear-type joints 37, 38 on the side of the gear unit, wherein the oil groove of each oil supply ring is connected through a radial duct 39, 40, respectively, to the central duct 10, 11. In addition, a centrifugal oil ring 41, 42 is arranged on each spindle shaft 12, 13 between the oil supply ring 8, 9 and the open end 48, 49.

Figure 3:
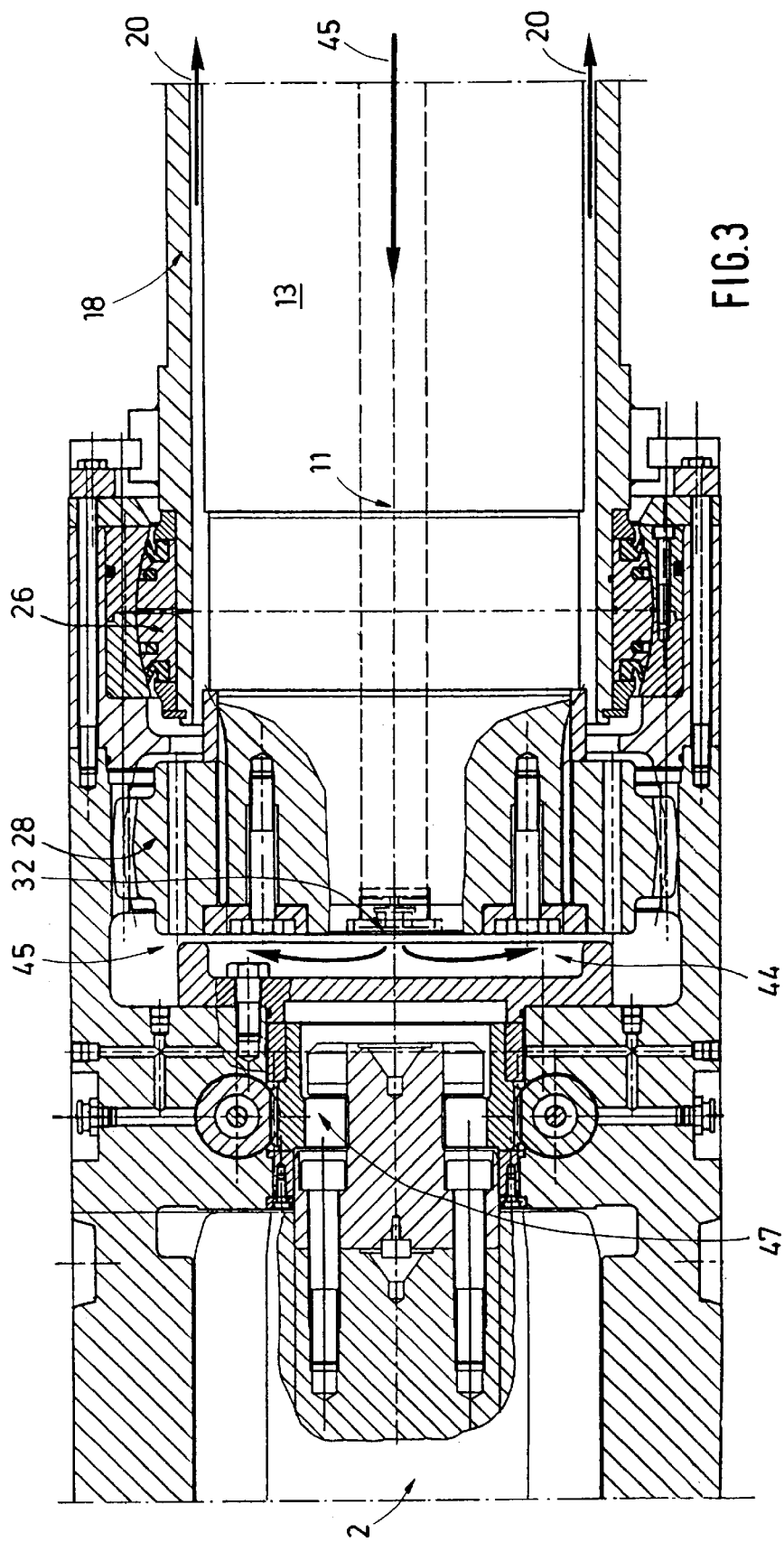
FIG. 3 is a sectional view of a portion of a gear-type joint spindle drive on the roll stand side.

Return oil emerges from the oil collection housing 14 in the lower portion at a pipe connection provided in this area with the line 43 and initially flows into a collection container from where it is returned through the oil cooler 15 to the oil delivery pump 16 which pumps oil back into the drive system through the pressure line 35. From the oil pressure line 35, the oil flow is divided into the two central ducts 10, 11 and flows in the direction of the arrow shown in the drawing initially into the gear-type joints 27, 28 on the side of the roll and through the collection chambers 44, 45 provided therein and through the gear-type joint 27, 28 in a forced manner due to the fact that the oil return flow pipes 17, 18 are sealed by the spherical joint 25, 26 into the oil return ducts 19, 20 formed between the oil return pipes 17, 18 and the spindle shafts 12, 13, as shown especially in FIG. 3.

FIG. 1 further shows that another partial flow of oil flows through the central ducts 10, 11 into the gear-type joints 37, 38 on the side of the gear unit and passes through the throttles 29, 30 and then flows openly into the collection housing 14, so that the joints 37, 38 are sufficiently lubricated and friction heat is removed. It is advantageous that the joints 37, 38 do not have to be sealed with sealing means to prevent an oil discharge, wherein the oil discharge is desired at this location.

Figure 4:
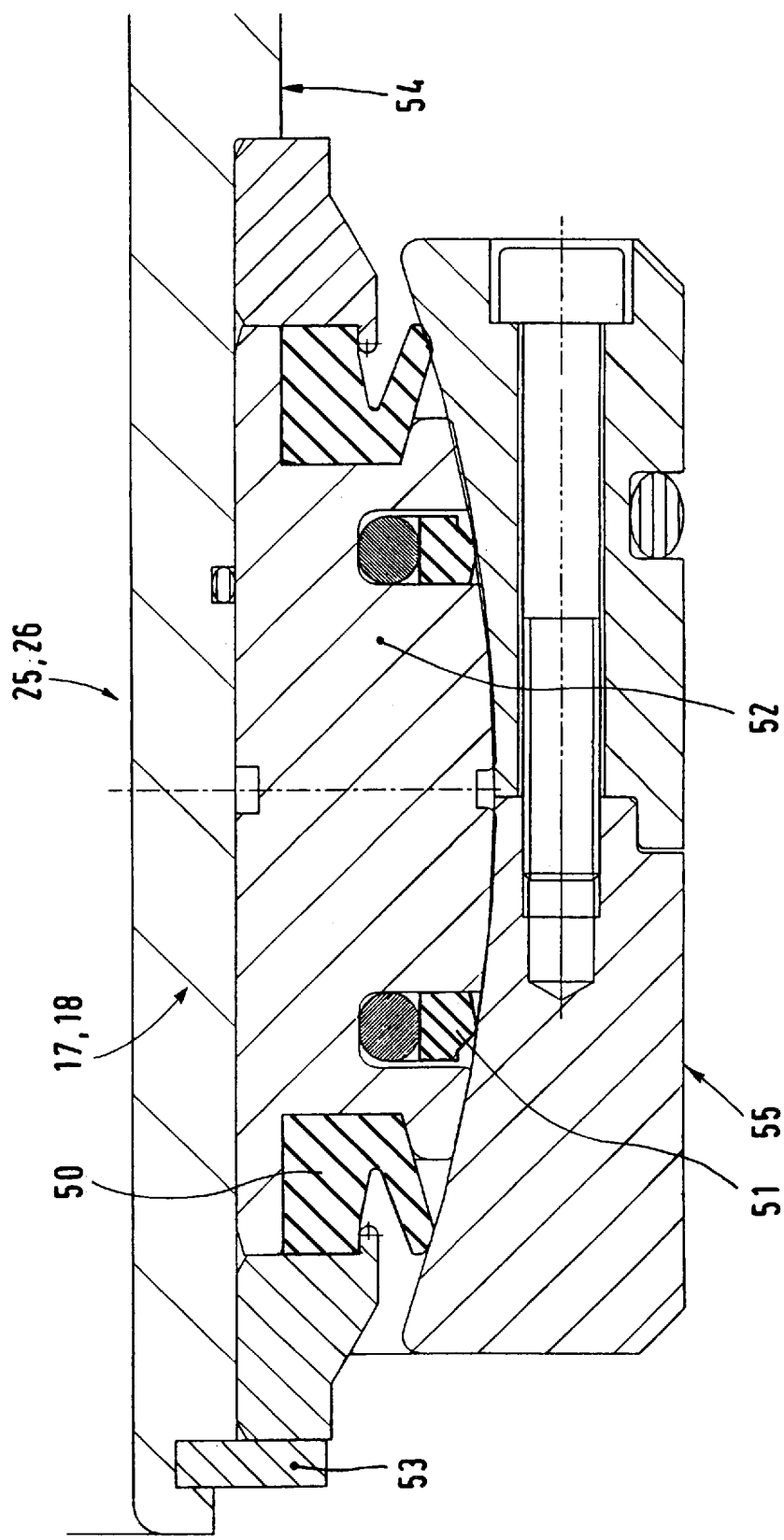
FIG. 4 is a sectional view, on an even larger scale, of a spherical joint at an oil return pipe.

FIG. 4 of the drawing is a sectional view showing the configuration of a spherical joint 25, 26 mounted on an oil return pipe 17, 18. The joint has a spherical base body 52 which is axially clamped between a shoulder 54 of the pipe 17, 18 and a stop ring 53. This stop ring 53 is clamped into a hollow-spherical, two-part receiving shell 55 and is hermetically sealed relative to the shell 55 by elastic sealing members 50, 51.

The rolling mill drive according to the present invention is not strictly limited to the illustrated example. For example, in accordance with an alternative embodiment, instead of the oil return at the side of the gear unit through the open pipes 17, 18 into a stationary oil collection housing 14, this housing 14 can be omitted and the pipes 17, 18 can be closed at their ends and surrounded by oil discharge rings which sealingly rest against the pipes, wherein the return oil is conducted through radial ducts of the pipes 17, 18 to the oil discharge rings and the oil discharge rings are themselves connected in a non-rotatable manner to oil discharge lines.

The rolling mill drive according to the present invention is uncomplicated and of robust construction and meets the above-described object in an optimum manner.

While specific embodiments of the invention have been shown and described in detail to illustrate the inventive principles, it will be understood that the invention may be embodied otherwise without departing from such principles.

We claim:

1. A rolling mill drive comprising spindles with gear-type joints, the spindles being arranged between driveable rolls and gear units of the driveable rolls and each being equipped with a device for circulatory lubrication of the gear units, each spindle comprising a grooved oil supply ring adapted for connection to an oil supply, each spindle having a spindle shaft forming a central duct, wherein oil is conductible through the central duct of the spindle shaft to the gear-type joints, further comprising a stationary housing surrounding the spindle shaft at a distance and serving for oil discharge, and an oil delivery pump connected on a pressure side to the oil supply rings and interacting with an oil cooler, a pipe surrounding each spindle at a radial distance therefrom so as to form an annular oil return duct, the pipe being open at an end thereof facing the gear unit, the pipe protruding for oil discharge into an oil collection housing, and an internally toothed spindle sleeve arranged at a side of the roll stand, wherein the oil return duct is in communication with the central duct through the spindle sleeve, further comprising a spherical joint mounted on the pipe for guiding in an articulated manner and for sealing the pipe on the side of the roll stand toward the outside relative to the spindle sleeve, wherein the central duct extends through the gear-type joint on the side of the gear unit and extends into the internally toothed spindle sleeve and has a throttle at an end of the gear unit, and wherein the central duct extends on the side of the roll stand through the gear-type joint on the roll stand side and has a throttle at an end at the roll stand side.

2. The rolling mill drive according to claim 1, wherein the spindles are mounted in a twin-type arrangement, wherein the oil supply rings of the spindles are in connection to the oil pump through a common pressure line serving for oil discharge.

3. The rolling mill drive according to claim 2, wherein the oil supply rings are mounted at the spindle shafts between open ends of the oil return pipes and the gear-type joints on the gear-unit side, and wherein an oil groove of each oil supply ring is connected through a radial duct to the central duct.

4. The rolling mill drive according to claim 1, further comprising a centrifugal oil ring mounted on each spindle shaft between the oil supply ring and an open end of the oil return pipe.

* * * * *